US009658823B2

United States Patent
Yang et al.

(10) Patent No.: US 9,658,823 B2
(45) Date of Patent: May 23, 2017

(54) SOURCE-TO-SOURCE COMPILER AND RUN-TIME LIBRARY TO TRANSPARENTLY ACCELERATE STACK OR QUEUE-BASED IRREGULAR APPLICATIONS ON MANY-CORE ARCHITECTURES (71) Applicant: NEC Laboratories America, Inc., Princeton, NJ (US)

(72) Inventors: Yi Yang, Plainsboro, NJ (US); Min Feng, Princeton, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 142 days.

(21) Appl. No.: 14/631,255

(22) Filed: Feb. 25, 2015

(65) Prior Publication Data

US 2015/0242323 A1    Aug. 27, 2015

Related U.S. Application Data (60) Provisional application No. 61/944,289, filed on Feb. 25, 2014.

(51) Int. Cl.
G06F 5/14 (2006.01)
G06F 9/45 (2006.01)
G06F 9/44 (2006.01)

(52) U.S. Cl.
CPC .............. *G06F 5/14* (2013.01); *G06F 8/4434* (2013.01); *G06F 8/30* (2013.01)

(58) Field of Classification Search
CPC ............. G06F 5/14; G06F 8/30; G06F 8/4434
See application file for complete search history.

(56) References Cited

U.S. PATENT DOCUMENTS 6,289,418 B1 *  9/2001  Koppala ............ G06F 9/30134
                                                    711/132
8,578,347 B1 * 11/2013  Carrick ............... G06F 11/3409
                                                    717/104
(Continued)

OTHER PUBLICATIONS

Burtscher, et al. "A Quantitative Study of Irregular Programs on GPU," IEEE, Nov. 2012, 10 Pages.

(Continued)

*Primary Examiner* — Li B Zhen
*Assistant Examiner* — Amir Soltanzadeh
(74) *Attorney, Agent, or Firm* — Joseph Kolodka (57) ABSTRACT Systems and methods for system for source-to-source transformation for optimizing stacks and/or queues in an application, including identifying usage of stacks and queues in the application and collecting the resource usage and thread block configurations for the application. If the usage of stacks is identified, optimized code is generated by determining appropriate storage, partitioning stacks based on determined storage, and caching tops of the stacks in a register. If the identifier identifies usage of queues, optimized code is generated by combining queue operations in all threads in a warp/thread block into one batch queue operation, converting control divergence of the application to data divergence to enable warp-level queue operations, determining whether at least one of the threads includes a queue operation, and combining queue operations into threads in a warp.

12 Claims, 3 Drawing Sheets (56) References Cited

U.S. PATENT DOCUMENTS

| | | | | |
|---|---|---|---|---|
| 2009/0259828 | A1* | 10/2009 | Grover | G06F 8/45 |
| | | | | 712/220 |
| 2013/0044924 | A1* | 2/2013 | Spencer | G06K 9/6282 |
| | | | | 382/128 |
| 2013/0247067 | A1* | 9/2013 | Schmit | G06F 9/4881 |
| | | | | 718/105 |
| 2014/0176588 | A1* | 6/2014 | Duluk, Jr. | G09G 5/001 |
| | | | | 345/541 |
| 2015/0026438 | A1* | 1/2015 | Giroux | G06F 9/38 |
| | | | | 712/225 |

OTHER PUBLICATIONS

Nasre, et al., "Atomic-free Irregular Computations on GPUs," in GPGPU, Mar. 2013, 12 Pages.

Tzeng, et al., "Task Management for Irregular-Parallel Workloads on the GPU," in Proceedings of the Conference on High Performance Graphics, Jun. 2010, 9 Pages.

Li, et al., "Understanding the Tradeoffs Between Software-Managed vs. Hardware-Managed Caches in GPUs," ISPASS, Mar. 2014, 11 Pages.

\* cited by examiner

SOURCE-TO-SOURCE COMPILER AND RUN-TIME LIBRARY TO TRANSPARENTLY ACCELERATE STACK OR QUEUE-BASED IRREGULAR APPLICATIONS ON MANY-CORE ARCHITECTURES

RELATED APPLICATION INFORMATION

This application claims priority to provisional application Ser. No. 61/944,289, filed on Feb. 25, 2014, incorporated herein by reference.

BACKGROUND

Technical Field

The present invention relates to a system and method for accelerating and/or optimizing performance for applications, and more particularly, to a source-to-source compiler and run-time library to transparently accelerate and/or optimize performance on stack or queue-based irregular applications on many-core architectures.

Description of the Related Art

Many-core graphics processor units (GPUs) have shown promising results for the applications that can utilize massive thread level parallelism (TLP) in last few years. For example, either a single Intel Many Integrated Core or a single General-purpose computing on graphics processing units (GPGPU) can provide Teraflops computation power in a second. However it currently remains a challenge to achieve high performance for irregular applications that operate on special data structures. For example, in order to minimize the computational complexity, the implementation of breadth first search (BFS) needs to maintain a queue as the frontier. The queue structure is widely used by many graph algorithms. Another example is the stack, which can be used to trace back in graphic algorithms, (e.g., Raytracing).

While queue structures and stack structures are very fundamental and widely used by application developers, there are several major limitations for using these data structures on GPGPUs. For example, due the lack of the mature implementations like C++ STL, application developers have to implement them by themselves on GPGPUs, and this requires additional effort and complicates the source code. Moreover, depending on the application developers background regarding computer hardware, the implementations of these data structures can have significant impact on the performance. It is noted that on CPUs, there may existing libraries which can be used by developers when using queues or stacks. However, on General-purpose computing on graphics processors (GPGPUs), such libraries are not available, and developers can only implement them using raw array access.

SUMMARY

A method for source-to-source transformation for optimizing, using a processor, one or more stacks in an application, including identifying the usage of the one or more stacks in the application; collecting resource usage and thread block configuration for the application; determining appropriate storage, and allocating the one or more stacks to the determined appropriate storage; partitioning items of the one or more stacks based on the determined storage; caching one or more tops of the one or more stacks in one or more registers; and generating optimized code.

A method for source-to-source transformation for optimizing, using a processor, one or more queues in an application, including identifying the usage of the one or more queues in the application, and identifying and caching items to be pushed into the queue in a local buffer; collecting resource usage and thread block configuration for the application; combining queue operations in all threads in a warp/thread block into one batch queue operation; converting control divergence of the application to data divergence to enable warp-level queue operations; determining whether at least one of the threads includes a queue operation; combining queue operations into threads in a warp; and generating optimized code.

A system for source-to-source transformation for optimizing, using a processor, one or more stacks and/or one or more queues in an application, including an identifier configured to identify the usage of the one or more stacks and the one or more queues in the application. If the identifier identifies the usage of one or more stacks, a storage determination module determines appropriate storage, a partitioning module partitions the one or more stacks based on the determined storage, and a caching module caches one or more tops of the one or more stack's in one or more registers. If the identifier identifies the usage of one or more queues, a combining module combines queue operations in all threads in a warp/thread block into one batch queue operation, a converting module converts control divergence of the application to data divergence to enable warp-level queue operations, and a queue determining module determines whether at least one of the threads includes a queue operation, and combines any queue operations into threads in a warp. A collector is configured to collect resource usage and thread block configuration for the application, and a code generator is configured to generate optimized code.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for transparently accelerating stack and/or queue-based irregular applications on many-core architectures using a source-to-source compiler and run-time library. The present principles solve the problem of efficiently using stacks and queues on many-core accelerators such as General-purpose computing on graphics processing units (GPGPUs). Developers who use stacks and queues in their programs currently have to implement the stacks and queues by themselves, and as such, it is difficult for them to develop high efficient implementation for GPGPU platforms.

In one embodiment, in order to allow application developers to use these data structures and address performance issues, the present principles may employ both the runtime library and static compilation. According to one embodiment, application developers may employ use the stack or the queue data structures similarly to how C++ STL are employed in their programs without additionally considering the optimizations for GPGPU platforms. The compiler may collect the static information and perform code transformation e.g., the conversion from control divergence to data divergence). Based on the static information, the compiler may link each operation of the stack, or the queue to an optimized implementation of the library (e.g., run-time library).

In one embodiment, for the implementation of the stack, the present principles may be employed to explore the possible choices using different memories so as to fully utilize both software and hardware caches. Since the stack may be an array used in a special way, and may be always accessed from the top, the present principles may be employed to cache the top of a stack in the registers to avoid un-necessary accesses to the array.

In one embodiment, for the implementation of the queue, the major overhead of the queue operations may be from the atomic instructions. The present principles include several systems and methods to reduce the atomic instructions. In one embodiment, the present principles may be employed to first cache the items of a queue in a local buffer for each thread, and then operate the queue in a batch way. Another method may be to combine the queue operations in either the warp level or the thread block level to avoid single operation by the single thread.

For a set of benchmarks including graph applications and graphic applications, experimental results from employing the present principles on NVIDIA TELSA K20c show remarkable performance gains (e.g., 4.36 times and 1.95 times speedup on average). Furthermore, the present principles provide a simple programming interface to application developers. Indeed, by employing a highly optimized library for the queue and the stack on GPGPUs, code development may be greatly simplified, and the systems and methods according to the present principles, may deliver high performance for these applications that use data structures (e.g., queues, stacks).

In one embodiment, the present principles may be employed to solve the above-mentioned problems by using a compiler-based approach. The present principles may employ one or more sets of source-to-source transformations. A compiler may inspect the source code, perform novel code transformations, and generate optimized code, which may leverage hardware resources (e.g., registers, shared memory, local memory, etc.) to significantly accelerate the irregular application on a target many-core architecture. This is a novel, first solution for automatically speeding stack and queue accesses for GPGPUs.

In summary, various embodiments according to the present principles may include the following novel applications: (1) Characterizing the usage of queue and the stack among GPGPU applications and highlighting that a stack may be private for a single thread, and a queue may be monotonic and shared by many threads in most cases; (2) simplifying the application development by offering, for example, a high performance library implementation with static analysis; (3) employing one or more sets of optimizations for GPGPU platforms and exploring the optimization space; and (4) significantly improving the performance while simplifying the development effort.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Prior to discussing various embodiments of the present principles in detail, some background on GPUs employing many-core architecture, threads, and queues will be briefly outlined below.

In order to achieve both high computation power and energy efficiency, many state-of-art GPUs employ many-core architecture. The GPGPUs manage the cores in a hierarchical manner. Using NVIDIA Kepler architecture as an example, each GPU contains multiple next generation streaming multiprocessors (SMXs), and each SMX includes multiple streaming processors (SPs). 32 SPs are grouped into an array to process a small group of threads using same-instruction multiple-data programming model. Such small group is also called a warp which contains 32 threads. In order to hide the pipeline latency and off-chip memory latency, the number of threads can be supported in each SMX is far more than the number of SPs in each SMX. For example, NVIDIA GTX 680 has 192 SPs each SM, and can support 2K threads each SMX. Such large number of thread pool provides a way to reduce the idle chance of these SPs.

Threads running on a GPU may also be organized in a hierarchy. A GPU may launch a GPU kernel with multiple thread blocks (TBs). Then each thread block may include multiple threads. Each SMX may have some on-chip resources such as registers, L1 cache and software-managed cache (shared memory). Depending on the resource requirement of a TB, and availability of the resource of each SMX one SMX can support one or more TBs concurrently. The GPU may provide a lightweight communication and synchronization for threads in a same thread block using on-chip resources. However, the cost of communication between two SMXs can be expensive.

The stack and the queue data structures are supported in C++ STL library and have been used in the programs of different areas. The major operations of the stack include push( ), pop( ) and top( ). There are also some operations such as size( ), empty( ) and full( ) to check the status of the stack. A straightforward stack implementation may be using an array and a count. When an item is pushed to the stack, the item may be placed to the array with the count as the address and increase the count by 1. The pop operation may reduce the count by 1 and return the item in the array with the count as the address. The maximum size of the stack can be either constant or dynamic. Since the dynamic size may require runtime memory allocation and deal location (which may have significant performance overhead and are not supported in legacy GPUs), developers have typically used a constant value as the maximum size for the stack in GPGPU applications.

As shown in pseudocode 1 below, a GPGPU application which implements the stack operation using, an array and a count is depicted. The variable i defined in line 3 is the count. The array of the stack is defined using two-dimension shared memory array mask. The first dimension is used to differentiate the offset for each thread, and the second dimension is the array for each thread. It is noted that the corresponding stack operations in pseudocode 1 are highlighted using bold fonts.

| Pseudocode 1: |
| --- |
| 1   #define THREAD_NUM 128 |
| 2   __global__ void nqueen (...) { |
| 3     int tid = threadIdx.x; |
| 4     __shared__ unsigned int4 mask[THREAD_NUM][10]; |
| 5     unsigned int4 *mystack = mask[tid]; |
| 6     int i = 0;                                     // init(stack) |
| 7     while(i >= 0) {         // while (!empty(stack)) |
| 8        if (...) { |
| 9           unsigned int4 v = mystack[i] | index;    // top(stack |
| 10          mystack[i++] = v;           // push(stack, v) |
| 11        } |
| 12        else { |
| 13           i --;                                 // pop(stack) |
| 14        } |
| 15     } |
| 16   } |

As compared to the stack which accesses data from the top, a queue may have a different exit and an entrance. It is noted that most conventional GPGPU programs only access a queue monotonically. In other words, a kernel may push items to a queue using etiquette, and another kernel may get items from the queue using dequeue. Such monotonic usage can reduce the overhead of the contention between dequeue and etiquette. Using breadth first search (BFS) as example, if a kernel performing both the dequeue and etiquette on a single queue is developed, a global synchronization is created to guarantee that all threads in different thread blocks finish enqueue operations on the queue before starting the dequeue. Unfortunately the global synchronization is not supported by current GPUs. The software implementation of such global synchronization may require dedicated design and high cost.

As shown in Pseudocode 2 below, an example of an implementation for BFS is depicted. The BFS employs two queues (one as the input and another as the output for the kernel). The dequeue and enqueue operations are shown in line 4 and line 9 respectively. Since the size of the input queue is unknown, the number of the thread may be launched to be the same as the size of the queue. The dequeue simply loads an item from the array. But for the enqueue, atomic instructions are employed to acquire a position for the output array, as each thread can have any number of items.

| Pseudocode 2: |
| --- |
| 1   __global__ void BFS (int* in, int* out, unsigned int *offset, |
| 2   ...) { |
| 3     int id = threadIdx.x + blockDim.x * blockIdx.x; |
| 4     int my = in[id];                         // dequeue(in) |
| 5     ... |
| 6     for (int i=0; i<neighbor; i++) { |
| 7        if(...) { |
| 8           int off=atomicAdd((unsigned int *)offset,I); |
| 9           out[off] = nid;                // enqueue(out) |
| 10        } |
| 11     } |
| 12   } |

As shown by Pseudocode 1 and 2, the implementations of the stack and the queue are straightforward. However, application developers may only use the raw array access and atomic actions to perform operations, and do not consider performance optimizations. The present principles may be employed to accelerate and optimize stack and queue based applications on many-core architectures in accordance with the present principles.

Figure 1:
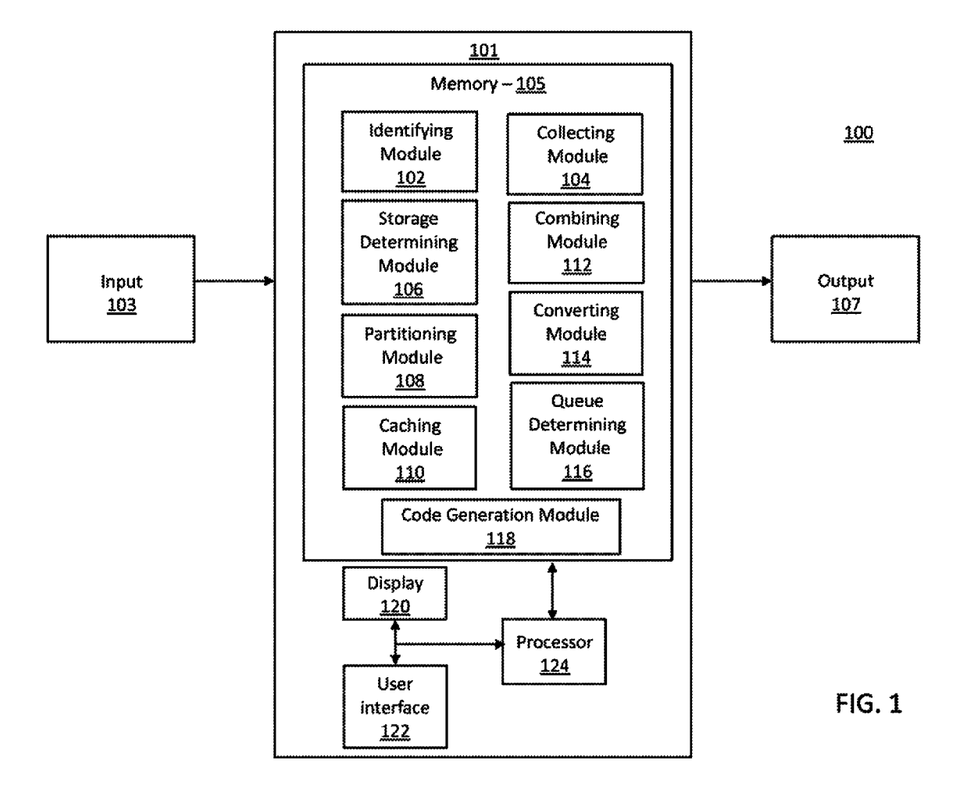
FIG. 1 is a block/flow diagram illustratively depicting a system for accelerating and/or optimizing performance for stack and/or queue-based applications on many-core architectures in accordance with the present principles.

Referring now to FIG. 1, a block/flow diagram illustratively depicting a system for transparently accelerating stack and/or queue-based irregular applications on many core architectures using, for example, a source-to-source compiler and run-time library 100 is illustratively depicted in accordance with the present principles. The system 100 may include a workstation or system 101. The system 101 may be a general purpose, or special purpose computer, and preferably includes one or more processors and/or coprocessors 124 and memory 105 for storing applications, modules, and other data.

In one embodiment, the system 101 may include one or more displays 120 for viewing. The displays 120 may permit a user to interact with the system 101 and its components and functions. This may be further facilitated by a user interface 122, which may include a mouse, joystick, or any other peripheral or control to permit user interaction with the system 101 and/or its devices. It should be understood that the components and functions of the system 101 may be integrated into one or more systems or workstations.

In one embodiment, the system 101 may receive input 103, and may identify the usage of one or more stacks in one or more applications in block 102. Resource usage and thread block configuration for one or more applications may be collected in block 104. Appropriate storage may be determined (e.g., local memory, shared memory, hybrid, of shared memory and local memory, etc. and one or more stacks may be allocated to the determined appropriate storage in block 106. Items of the one or more stacks may be partitioned based on the determined storage in block 108, one or more tops of the one or more stacks in one or more registers may be cached in block 110, optimized code may be generated in block 118, and output in block 107 according to one embodiment of the present principles.

In one embodiment, the system 101 may receive input 103 may identify the usage of one or more queues, and identify and cache items to be pushed to a queue in a local buffer in block 102. Resource usage and thread block configuration for one or more applications may be collected in block 104. Queue operations in all threads in a warp/thread block may be combined into one batch operation in block 112, and control divergence of one or more applications may be converted to data divergence to enable warp-level queue operations in block 114. A queue determining module 116 may be employed to determine, whether at least one of one or more threads includes a queue operation, and optimized code may be generated in block 118, and output in block 107 according to one embodiment of the present principles.

It is noted that while the above-mentioned system and modules are illustratively provided, it is contemplated that other sorts of systems and modules may also be employed according to the present principles.

Figure 2:
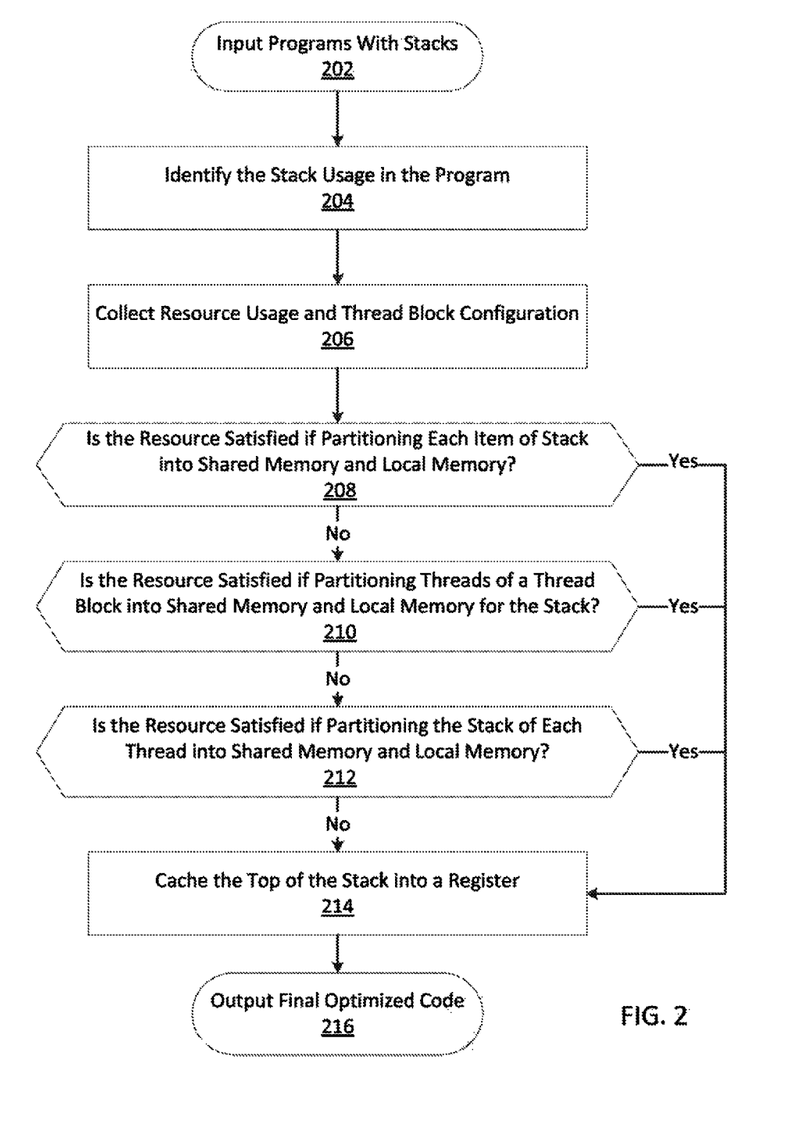
FIG. 2 is a block/flow diagram illustrating a system/method for accelerating and/or optimizing performance for stack-based applications on many-core architectures in accordance with the present principles.

Referring now to FIG. 2, a system/method for accelerating and/or optimizing performance for applications using stacks on many-core architectures is illustratively depicted in accordance with the present principles. In one embodiment, programs using stacks may be input in block 202. It is noted that stacks may be optimized on GPGPUs such that the application may include code written using operations such as empty(stack), top(stack), push(stack, v), and pop (stack) using an embodiment of the present principles, rather than using conventional methods, which require raw array accesses. This greatly simplifies the development effort.

In one embodiment, the overall transformation for stack based programs may first identify stack usage in a program (e.g., a GPU application) in block 204. Stack usage may include, for example, an application which employs an array and a stack point. To push an item into the stack, the item may be placed on the array with the stack point as the address, and the stack point may be increased by one. Resource usages including, for example, shared memory and/or local memory, and thread block configuration for the program may be collected in block 206.

In one embodiment, one or more stacks may be allocated to an appropriate storage among shared memory, local memory, or the hybrid of shared memory and local memory. The present principles may be employed to attempt to partition one or more items of the one or more stacks, and may determine whether the resource is satisfied if each item of the one or more stacks is partitioned into shared memory and local memory. If yes, the top of a stack may be cached into a register in block 214, and the final optimized code may be generated and output in block 216. If no, the present principles may next be employed to attempt to partition one of more threads of each of one or more thread blocks, and may determine whether the resource is satisfied if partitioning threads of a thread block into shared memory and local memory for one or more stacks, if yes, the top of a stack may be cached into a register in block 214, and the final optimized code may be venerated and output in block 216. If no, the present principles may be employed to attempt to partition one or more stacks of one each of one or more threads, and may determine whether the resource is satisfied if partitioning, the stack of each thread into shared memory and local memory in block 214. If yes, the top of a stack may be cached into a register in block 214, and the final optimized code may be generated and output in block 216. If no, the top of a stack may also be cached into a register in block 214, and the final optimized code may be generated and output in block 216.

In one embodiment according to the present principles, as shown in Pseudocode 3 below, stack operations may be implemented using functions to hide the array accesses. Some other operations such as empty( ), and size( ) are not shown in the figure, as they are straightforward and have minor impact on the performance. In one embodiment, two optimizations for the implementation of the stack (e.g., hybrid storage usage, and stack top register) are illustratively depicted according to the present principles. These optimizations can be integrated into the functions in Pseudocode 3, and may be implicit to application developers (e.g., application developers may use these functions without any knowledge of how the functions are implemented).

Pseudocode 3:

```
1    struct Stack {
2        int count;
3        int4* data;
4    }
5    __device__ void init(Stack& st, int4* array) {
6        st.count = 0;
7        st.data = array;
8    }
9    __device__ void push(Stack& st, int4 v) {
10       st.data[st.count++] = st.top;
11   }
12   __device__ void pop (Stack& st) {
13       return st.data[--st.count];
14   }
15   __device__ void top(Stack& st) {
16       return st.data[st.count-1];
17   }
```

It is noted that since the performance of a stack highly relies on the accesses of the array inside the stack, using on-chip resource as the storage for the array may be preferred to achieve the low latency and high bandwidth. In Pseudocode 1, an example using shared memory as the storage was depicted, and it is shown how the array may be initialized in Pseudocode 4(a) below. However, it is thither noted that heavy usage of shared memory can limit the TLP and therefore hurt the performance. Conventional systems and methods cannot reduce such overhead in the case where shared memory is used in most of the execution time.

In order to reduce the usage of share memory, local memory which can be cached in L1 cache to improve the throughput may be employed according to the present principles, as shown in Pseudocode 4(b). Although the usage of local memory doesn't have any limit on the TLP, the pressure on L1 cache can make the performance even worse. The present principles may be employed to overcome these deficiencies, and may determine appropriate storage by, flier example, using methods employing one or more variations of the Pseudocode discussed herein, and may include utilizing both shared memory and local memory for the storage of the stack, so as to leverage both the software-managed and hardware-managed caches.

Psuedocode 4:

```
__shared__ unsigned int4 mask[THREAD_NUM][10];
Stack stack;
init(stack, mask[tid]);
```
(a) A stack using shared memory

| Psuedocode 4: |
|---|
| unsigned int4 mask [10];<br>Stack stack;<br>init(stack, mask);<br>(b) A stack using local memory |

In a multiple-threads context, the present principles may be employed in several ways to partition a storage used by many threads. For illustrative purposes, assume the case that each thread block has K threads, each thread requires a stack containing M items, and each item is N integers.

In one embodiment, one or more hybrid thread blocks (TBs) may be employed according to the present principles. Under the stack based on hybrid TB method, for each thread block, K1*M items may be allocated in shared memory for K1 threads, and K2*M items in local memory for K2 threads, where K is the summation of K1 and K2. One such example is shown in Pseudocode 5 below. The value of K1 is THREAD_NUM*RATIO in this case. A potential issue is that the pointer in the stack may be either a shared memory pointer or a local memory pointer, which can confuse conventional compilers. In other words, the latency of an access to the array may not be clear to a conventional compiler, and may reduce the optimization opportunities.

| Pseudocode 5 (stack based on hybrid TB): |
|---|
| #define RATIO 3/4<br>    __shared__ unsigned int4<br>        mask[THREAD_NUM_RATIO][10];<br>    unsigned int4 local_mask [10];<br>    Stack stack;<br>    if (tid>=THREAD_NUM*RATIO)<br>        init(stack, mask[tid]);<br>    else<br>        init(stack, local_mask) |

In one embodiment, one or more hybrid threads may be employed according to the present principles. Under the stack based on hybrid thread approach, for each thread. M1 items may be allocated in shared memory, M2 items in local memory, where M is the summation of M1 and M2. As illustratively depicted in Pseudocode 6 below, one array may be determined to be appropriate storage, and may be allocated in shared memory and another array in the local memory, with the overall size of two arrays per thread being 10, Then in this case, the M1 is 7, and M2 is 3. In this example, when the stack is accessed using top, pop, push, if the count is less than 7, shared memory may be used. Otherwise, the local memory may be used. Now each stack may maintain two pointers and the compiler may dearly know the accesses to each pointer. But for each operation among pop, push, and top, a conventional compilers still may not know whether the operation will go to shared memory or local memory in compilation time.

| Psuedocode 6 (stack based on hybrid thread): |
|---|
| __shared__ unsigned int4 [THREAD_NUM][7];<br>_unsigned int4 local_mask [3]:<br>Stack stack;<br>init(stack, mask[tid], local_mask); |

In one embodiment, one or more hybrid items may be employed according to the present principles. Under the stack based on hybrid items approach, appropriate storage may be determined to be, for example, both shared memory and local memory, and for each item, N1 items may be allocated in shared memory, and N2 items in local memory, where N is the summation of N1 and N2. As illustratively depicted in Pseudocode 7 below, an int4 (which includes four integers), may be partitioned into an int3 (which includes three integers), and an int (which includes one integer). The top, pop, and push functions may be modified to gather an int4 from two arrays or store an int4 into two arrays. However, such gather and partition may not be visible for application developers, and conventional compilers can identify the type of each memory access for each pop, top, or push operation.

| Pseudocode 7 (stack based on hybrid item): |
|---|
| __shared__ unsigned int3<br>    mask[THREAD_NUM][10];<br>unsigned int local_mask [10];<br>Stack stack;<br>init(stack, mask[tid], local_mask); |

It is noted that except the pop and push operations, some programs may have intensive usage of top operations. Although the shared memory may have very high bandwidth and low latency, it is still slower than the register. Therefore, the present principles may be employed to cache the top item in the register in block 214. The register used to cache the top item will hereinafter be referred to as "top register" in this paper. In one embodiment, the top operation is just a register operation instead of an array access. As shown in Pseudocode 8, line 4, below, one additional item may be added in the stack structure. When a push operation is performed, the new value may be placed to the top register as shown in line 7. The pop operation may move one item from the array to the top register in block 214. This may increase some register movements, while reducing many array accesses if an application has a large number of top operations.

| Pseudocode 8 (Optimization using stack top register): |  |
|---|---|
| 1 | struct stack { |
| 2 |     int count; |
| 3 |     int4* data; |
| 4 |     int4 top; |
| 5 | }; |
| 6 | __device__ void push(stack st, int4 v) { |
| 7 |     st.top = v; |
| 8 |     st.data[st.count++] = st.top; |
| 9 | } |
| 10 | __device__ void pop (stack st) { |
| 11 |     int4 tmp = st.top; |
| 12 |     if (st.count>0) st.top = st.data[--st.count]; |
| 13 |     return tmp; |
| 14 | } |
| 15 | __device__ void top(stark st) { |
| 16 |     return st.top; |
| 17 | } |

Figure 3:
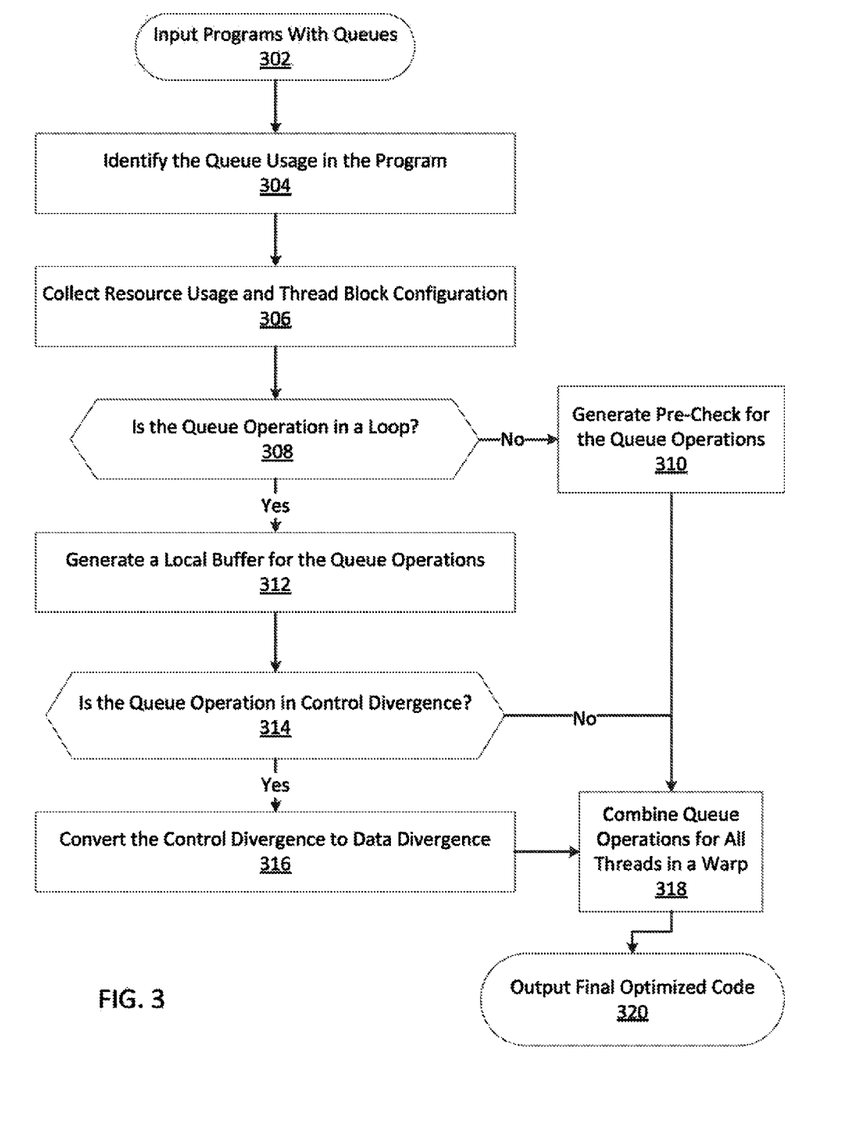
FIG. 3 is a block/flow diagram illustrating a system/method for accelerating and/or optimizing performance for queue-based applications on many-core architectures in accordance with the present principles in accordance with the present principles.

Referring now to FIG. 3, a system/method for accelerating and/or optimizing performance for applications using queues on many-core architectures is illustratively depicted in accordance with the present principles. Before discussing the various embodiments of optimizations according to the present principles in detail, a high level illustration of a method of implementing a queue by GPGPU applications is depicted in Pseudocode 9 below. For simplicity of illustration, only two major functions queue and dequeue are shown, it is also assumed that the data array has sufficient memory to store all data from etiquette operations, and dequeue can always get the data. It has been shown that the dequeue operation may be simplified to avoid atomic operation, as shown in Pseudocode 2, line 4, and therefore generally has minor impact on performance. Therefore, based on the implementation shown in Pseudocode 9, the embodiments of optimizations according to the present principles will be discussed mainly with respect to the coquette operation.

```
Pseudocode 9:
1    struct queue {
2        int* start;
3        int* end;
4        int* data;
5    };
6    __device__ void enqueue(Queue* q, int nid) {
7        int off =atomicAdd(q->end; 1);
8        q->data[off] = nid;
9    }
10   __device__ int dequeue(Queue* q) {
11       int off =atomicAdd(q->start, 1);
12       return q->data[off];
13   }
```

In one embodiment, one or more programs using one or more queues may be input in block 302. According to the present principles, the overall transformation for queue-based programs may first identify queue usage in a program (e.g., a GPU application) in block 304. Queue usage may include, for example, an application m which each thread uses an atomic instruction to increase a count by 1, and then may push an item to an array using the count. Resource usages, including, for example, shared memory and/or local memory, and thread block configuration may be collected for the one or more programs in block 306.

In one embodiment, the present principles may be employed to determine if a queue operation (e.g., enqueue operation) is in a loop in block 308. If yes, a local buffer may be generated, and employed to cache the item to be pushed into the queue in block 312. If the local buffer is full, all items in the local buffer may be pushed to the queue so as to reduce the number of queue operations. If a queue operation (e.g., enqueue) is not in a loop, the present principles may be employed to determine whether at least one thread has queue operation by generating a pre-check for the queue operations in block 310 before combining queue operations in some or all threads in a warp/thread block into one batch queue operation using a scan algorithm in block 318, and generating and outputting final optimized code in block 320.

In one embodiment, the present principles may be employed to determine whether the program and/or the queue operation is in control divergence in block 314. If yes, and the program which includes control divergence may not be combined for threads in a warp, the control divergence of the program may be convened to data divergence in block 316 before combining queue operations in some or all threads in a warp/thread block into one batch queue operation using a scan algorithm in block 318, and generating and outputting final optimized code in block 320.

As shown in Pseudocode 2, the enqueue operation may require one atomic operation to acquire one position in an array. In one embodiment, the present principles may be employed to cache the items to be pushed into a queue using a local buffer. As shown in Pseudocode 10 below, the present principles may be employed to use the above-mentioned local buffer to reduce the atomic operations.

For example, in one embodiment, as shown in Pseudocode 10 below, two more parameters are present for the etiquette function. The may be used to cache items for the etiquette, and the buffer_count is the number of items in bulk. Therefore in the etiquette function may always first write the item to the local buffer as shown in line 3, and then may check whether the local buffer is full in line 4. If the local buffer is full, all items from the local buffer to the queue may be stored with a single atomic operation to acquire multiple positions in line 5. This may reduce the overall atomic operations. Similar to the stack, the storage of such local cache can be either local memory or shared memory. In one embodiment, the data may only be written to the queue when the local cache is full, and as such, additional flush operations may be appended to the end of each thread to force writing of the data in the local cache to the queue. This may add only a very small change to the source code, or it may be performed using a compiler according, to the present principles.

```
Pseudocode 10 (Queue with local buffer):
1    __device__ int enqueue_buffer(Queue* q. int nid, int* buffer, int
2    buffer_count) {
3        buffer[buffer_count++] = nid;
4        if (buffer_count==MAX_COUNT) {
5            int off = atomicAdd(q->start, buffer_count);
6            for (int i=0; i< buffer_count; i++)
7                q->data[off+i] = buffer[i];
8            buffer_count = 0;
9        }
10   }
```

In one embodiment, while the local buffer may reduce the atomic operations to 1/N, where N is the size of the buffer, the present principles may be employed to further reduce the atomic operations in warp-level. A high level description of the process according the present principles is to combine the etiquette operations from multiple threads, and the present principles may also be employed to combine the enqueue operations from the threads in a same warp.

In one embodiment, we may, for example, assume there are no divergences for all threads in a warp execute. In other words, all threads in the warp may execute the enqueue function. Then the etiquette operation may be implemented as enqueue_warp as shown in Pseudocode 11 below. In this function, we lane id within the warp may be calculated for each thread. Then for each warp, just a single thread may be employed to execute an atomic operation to acquire the positions for all threads in the warp, as shown in line 6. A _ shfl instruction may be employed to broadcast the offset address in the queue for this warp, as shown in line 7. The _shfl instruction may take three parameters, and therefore, all threads may read the value of off from the lane id 0 within, for example, 32 (WARP_SIZE) threads in a warp. If using, legacy GPUs, the shared memory may be used for such broadcast. Furthermore, each thread may write its item to the queue based on the offset of the warp and its lane id, and as such, just one atomic operation may be employed for a whole warp, although more may be employed if desired.

```
Pseudocode 11 (Warp-level enqueue without data divergence)
1    __device__ int enqueue_warp(Queue* q, int nid) {
2        int warpId = threadIdx.x/WARP_SIZE;
3        int laneID = threadIdx.x%WARP_SIZE;
```

Pseudocode 11 (Warp-level enqueue without data divergence)

```
4      int off;
5      if (lancI==0)
6          off =atomicAdd((unsigned int *)q->start,WARP_SIZE);
7      off = __shfl(off, 0, WARP_SIZE);
8      q->data[off+laneId] = nid ;
9      }
```

It is noted that it is common for threads in a same warp to have data divergences. For example, in line 7 of the Pseudocode 2 (depending on the results of if statement), a thread may or may not execute the etiquette operation. In such a case, the result of the if statement may be considered as an input parameter of the enqueue function. Then the number of threads that have the etiquette operations may be calculated based on the input parameter, and may use atomic operation to get accurate positions for a warp. In one embodiment, a highly efficient implementation of scan function may be employed for such a calculation.

In one embodiment, as shown in Pseudocode 12 below, an example is shown in which all threads in a warp are active, but only some threads have items for enqueue operations in the etiquette_warp_scan. If the last parameter fill is true/1, then this may indicate that this thread hays an item for the etiquette operation. As shown in line 6, a function scan_warp may be employed to perform a scan operation on the value of fill. The result of pox of the last thread within the warp may be the over number of threads whose values of fill are 1. Furthermore, the pos-1 may be the relative offset in the queue for every thread.

Pseudocode 12 (Warp-level enqueue with data divergence)

```
1      __device__ int enqueue_warp_scan(
2      Queue* q, int nid, int fill) {
3          int warpId = threadIdx.x/WARP_SIZE;
4          int laneID = threadIdx.x%WARP_SIZE;
5          int pos;
6          pos = scan_warp(laneId, fill);
7          if (laneId==WARP_SIZE-1)
8              off =atomicAdd((unsigned int *)q->start,WARP_SIZE);
9          off = __shfl(off, 0, WARP_SIZE);
10         if (fill==1)
11             q->data[off+pos-1] = nid;
12     }
```

In one embodiment, a purpose of above-mentioned code transformation, which converts an if statement to an input, parameter of etiquette function is to convert a control flow divergence to a data divergence. For example, for the for loop in Pseudocode 2, such a conversion may also be performed, and by employing the present principles, the final output may be as shown in Pseudocode 13 below. From Pseudocode 13, it may be seen that for a loop, the maximum loop counts may calculated among threads in a warp (as shown in line 4), the loop may execute to the maximum count, as shown in line 5. Inside the loop, for each control divergence including the loop condition, a flag for each thread may be maintained. Therefore as shown in Pseudocode 13, the flag1 may be the actual condition to decide the execution of the loop body. Furthermore, the flag2 may be the flag for the if statement, and the fill parameter of the etiquette operation may be the and (&) operation of parents conditions of the original enqueue operations according to one embodiment.

Pseudocode 13 (Warp-level enqueue aver converting control divergence to data divergence):

```
1      __global__ void BFS (Queue* in, Queue * out, ... ){
2      int my = dequeue(in);
3      ...
4      int maximum = warp_maximum(neighbor);
5      for (int i=0; i<maximum; 1++) {
6          int flag1 = i<neighbor?1:0;
7          int flag2 = 0;
8          if (flag1) {
9              if (...) {
10                 flag2 = 1;
11             }
11         }
13         enqueue(out, nid, flag1&flag2);
14     }
15     }
```

In one embodiment, since the local buffer approach and warp-level queue operation may be in the different dimensions to combine queue operations, either, or both approaches may be applied for best performance. For simplicity, the combined approach is not shown here, as it can be done by making small modifications to enqueue_warp_scan functions. For example, first, the second parameter may be changed to an array for the local buffer, and the fill may be the count of the items in the local buffer. Then, all items in the local buffer may be written to the queue. Now each thread may have more than one item to write to the queue. All items may also be organized in the shared memory, and then the data may be written to global memory in a coalesced way.

In one embodiment, a pre-check may be performed in block 310 before warp level operations in accordance with the present principles. A purpose of warp-level queue operation may be to reduce the number of atomic operations by performing warp-level scan. However, in some cases, none of threads in a warp have the queue operation. For example, the conditions of if statement in line 7 of Pseudocode 2 may be false for all threads in a war, in which case the scan, atomic, and even fill check may be costly compared to the baseline.

Therefore, according to the present principles, an additional pre-check may be introduced before performing the workload in, for example, enqueue_warp_scan function. The pre-check can be implemented using a warp vote instruction (e.g., _any(flag)), on NVIDIA GPUs, for example. The _any instruction may check flags in all threads in a warp. If the value of the flag of any thread is true, then the output is true. Therefore, for in Pseudocode 12, the value of the _any(fill) may first be checked, and if it is true, the application may continue with further optimization. If not, then the application may continue without optimization according to the present principles.

In one embodiment, the present principles may be applied to thread block (TB)-level queue operations. Since threads with a TB can communicate with each other at a high speed, the approach that combines the queue operations from all threads in a same thread block may be implemented in these cases. For the case that threads don't have divergence, the implementation is very similar to the code shown in Pseudocode 11. However, shared memory may be used for the value of off in Pseudocode 11 and _syncthreads( ) may be employed to synchronize threads in a thread block. The performance overhead of combination for a thread block is also minor, as the only communication is to broadcast the basic offset of the position in the queue for a thread block. However, for the case that threads in a thread block have divergences, it may introduce significant overhead due the scan operation across different warps.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an Appendix to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for source-to-source transformation for optimizing, using a processor, one or more stacks in an application, comprising:
    identifying the usage of the one or more stacks in the application and the one or more queues in the application, and identifying and caching items to be pushed into the queue in a local buffer;
    wherein if an enqueue operation is in a loop, the items to be pushed into the queue in a local buffer are identified and pushed, wherein all items in the local buffer are pushed to the queue if the local buffer is full to determine whether at least one thread includes a queue operation, and
    wherein if the enqueue operation is not in a loop, a pre-check for queue operations is performed to determine whether at least one thread includes a queue operation;
    collecting resource usage and thread block configurations for the applications; and
    generating optimized code, wherein the optimized code is generated by:
    combining queue operations in all threads in a warp/thread block into one batch queue operation;
    converting control divergence of the application to data divergence to enable warp-level queue operations;
    determining whether at least one of the threads includes a queue operation; and
    determining appropriate storage, and allocating one or more stacks to the appropriate storage, the determining appropriate storage further comprising:
        determining whether a resource is satisfied if each item in the one or more stacks is partitioned into shared memory and local memory,
        wherein if the resource is determined to not be satisfied, partitioning one or more threads of each of one or more thread blocks into the shared memory and local memory for one or more stacks to identify whether the resource is satisfied;
        wherein if the resource is identified as not being satisfied, partitioning one or more stacks of each of one or more threads into the shared memory and local memory to determine if the resource is satisfied, and
        wherein if the resource is satisfied, caching one or more tops of the one or more stacks in one or more registers; and
    outputting final optimized code based on the determined appropriate storage, wherein generation of the optimized code includes combining queue operations into threads in a warp, wherein control divergence is converted to data divergence before combining queue operations.

2. The method as recited in claim 1, wherein the collecting resource usages includes collecting shared memory and local memory for the application.

3. The method as recited in claim 1, wherein the appropriate storage includes shared memory, local memory, and/or a hybrid of shared memory and local memory.

4. A method for source-to-source transformation for optimizing, using a processor, one or more queues in an application, comprising:
    identifying the usage of the one or more queues in the application, and identifying and caching items to be pushed into the queue in a local buffer,
        wherein if an enqueue operation is in a loop, the items to be pushed into the queue in the local buffer are identified and pushed, wherein all items in the local buffer are pushed to the queue if the local buffer is full to determine whether at least one thread includes a queue operation, and
        wherein if the enqueue operation is not in a loop, a pre-check for queue operations is performed to determine whether at least one thread includes a queue operation;
    collecting resource usage and thread block configurations for the application; and
    generating optimized code, wherein the optimized code is generated by:
    combining queue operations in all threads in a warp/thread block into one batch queue operation;
    converting control divergence of the application to data divergence to enable warp-level queue operations;
    determining whether at least one of the threads includes a queue operation; and
    combining queue operations into threads in a warp, wherein the control divergence is converted to the data divergence before the combining queue operations.

5. The method as recited in claim 4, wherein the determining whether at least one thread includes a queue operation is performed before combining queue operations in threads in a warp if an enqueue is not in a loop.

6. The method as recited in claim 4, wherein the control divergence is converted to data divergence if the application including control divergence cannot be combined for threads in a warp.

7. A system for source-to-source transformation for optimizing, one or more stacks and/or one or more queues in an application, comprising:
    a processor;
    an identifier configured to identify usage of the one or more stacks and the one or more queues in the application and identifying and caching items to be pushed into the queue in a local buffer;
    wherein if an enqueue operation is in a loop, the items to be pushed into the queue in a local buffer are identified and pushed, wherein all items in the local buffer are pushed to the queue if the local buffer is full to determine whether at least one thread includes a queue operation, and
    wherein if the enqueue operation is not in a loop, a pre-check for queue operations is performed to determine whether at least one thread includes a queue operation;

a collector configured to collect the resource usage and thread block configurations for the application;

wherein if the identifier identifies the usage of one or more stacks, a code generation module generates optimized code using:

a storage determination module configured to determine appropriate storage, the determining appropriate storage further comprising:

determining whether a resource is satisfied if each item in the one or more stacks is partitioned into shared memory and local memory, wherein if the resource is determined to not be satisfied, partitioning one or more threads of each of one or more thread blocks into the shared memory and local memory for one or more stacks to identify whether the resource is satisfied;

wherein if the resource is identified as not being satisfied, partitioning one or more stacks of each of one or more threads into the shared memory and local memory to determine if the resource is satisfied, and wherein if the resource is satisfied, caching one or more tops of the one or more stacks in one or more registers; and wherein if the identifier identifies the usage of one or more queues, a code generation module generates optimized code using:

a combining module configured to combine queue operations in all threads in a warp/thread block into one batch queue operation, a converting module configured to convert control divergence of the application to data divergence to enable warp-level queue operations, and a queue determining module configured to determine whether at least one of the threads includes a queue operation, and combines any queue operations into threads in a warp, wherein the control divergence is converted to the data divergence before the combining queue operations.

8. The system as recited in claim 7, wherein the collecting resource usages includes collecting shared memory and local memory for the application.

9. The system as recited in claim 7, wherein the appropriate storage includes shared memory, local memory, and/or a hybrid of shared memory and local memory.

10. The system as recited in claim 7, wherein the determining whether at least one thread includes a queue operation is performed before combining queue operations in threads in a warp if an enqueue is not in a loop.

11. The system as recited in claim 7, wherein the identifier is further configured to identify and cache items to be pushed into the one or more queues in a local buffer, wherein the items to be pushed into the queue in the local buffer are identified and pushed if an enqueue operation is in a loop.

12. The system as recited in claim 7, wherein the control divergence is converted to data divergence if the application including control divergence cannot be combined for threads in a warp.

* * * * *